United States Patent
Bishop et al.

(12)

(10) Patent No.: US 6,350,790 B1
(45) Date of Patent: Feb. 26, 2002

(54) PROCESS FOR PREPARING UNIFORMLY CONSISTENT RADIATION-CURABLE COMPOSITIONS

(75) Inventors: Timothy E. Bishop, Algonquin, IL (US); Paul E. Snowwhite, Muskego, WI (US); James R. Petisce, Jacksonville, FL (US); John M. Zimmerman, Crystal Lake; James R. Turner, Frankfort, both of IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/570,532

(22) Filed: May 12, 2000

Related U.S. Application Data

(60) Provisional application No. 60/134,226, filed on May 14, 1999.

(51) Int. Cl.[7] ............................... C08F 2/50; C08J 3/28
(52) U.S. Cl. ............................... 522/1; 522/3; 522/18; 522/64; 522/96; 522/97; 522/173; 522/182; 427/496; 427/508
(58) Field of Search ............................ 522/96, 182, 1, 522/3, 97, 173, 18, 64; 427/496, 508

(56) References Cited

U.S. PATENT DOCUMENTS

| 4,608,409 A | * | 8/1986 | Coady et al. |
| 4,629,287 A | * | 12/1986 | Bishop |
| 4,690,502 A | * | 9/1987 | Zimmerman et al. |
| 4,741,958 A | * | 5/1988 | Bishop |
| 4,923,915 A | * | 5/1990 | Urruti |
| 4,932,750 A | * | 6/1990 | Ansel et al. |
| 5,907,023 A | * | 5/1999 | Chawla |
| 5,908,873 A | * | 6/1999 | Shustack |

* cited by examiner

*Primary Examiner*—Susan W. Berman
(74) *Attorney, Agent, or Firm*—Pillsbury Winthrop LLP

(57) ABSTRACT

The process of the present invention involves forming a series of radiation-curable compositions having uniformly consistent properties.

The process involves forming a pre-composition, measuring an in-situ sample of said pre-composition to determine a property of the cured pre-composition and adding at least one adjusting agent to form a radiation-curable composition and repeating this process to form at least one further radiation-curable composition wherein said property value for each of said radiation-curable composition and said at least one further radiation-curable composition are each within a target value range for said property.

31 Claims, 2 Drawing Sheets

PROCESS FOR PREPARING UNIFORMLY CONSISTENT RADIATION-CURABLE COMPOSITIONS

This application claims benefit of U.S. application Ser. No. 60/134,226, filed May 14, 1999.

FIELD OF THE INVENTION

The present invention relates to a method of forming a series of radiation-curable composition having uniformly consistent properties. In particular, the method of the present invention relates to a method of forming a series of radiation-curable compositions wherein the radiation-curable composition may be used for any one or more of a variety of uses including, for example, coatings on fiber optics and/or coatings which form part of fiber optic cable assemblies such as: primary, colored or uncolored outer primary coatings as well as other coatings including inks and matrix materials.

BACKGROUND OF THE INVENTION

Radiation-curable compositions are formed from radiation-curable oligomers which are themselves reaction products of polymeresation reactions. These polymeric reaction products typically comprise a majority of the desired oligomer but may also contain other components including some unreacted and partially reacted components as well as other polymeric reaction by-products. In addition to the variation in the make-up of the reaction products, the reaction process itself is difficult to control and additionally introduces variation into the resulting reaction products.

Since these polymer reaction products are used as the oligomer component in radiation-curable compositions, the resulting properties of typical radiation-curable composition are widely ranging. Consequently, the specification ranges for commercial radiation-curable compositions at present in industry include relatively large ranges. Since these compositions can vary as much as 30% from a target value for a given property, it is necessary for production facilities that use such compositions to implement production control mechanisms designed to address these relatively large variations in the properties of the radiation-curable compositions.

Of course, any attempt to produce a series of compositions with tight control of one choosen property generally will adversely affect the control or the magnitude of other properties of the radiation-curable compositions. For example, a method of production that is able to provide a series of radiation-curable compositions having uniformly consistent parameters achieved by adding a component, for instance a chain transfer agent that sacrifices the cure speed of the composition, would be unacceptable.

SUMMARY OF INVENTION

In accordance with the present invention, there is provided a method of forming a series of radiation-curable compositions (e.g. R1, R2 . . . ) having at least one uniformly consistent property.

The process of the present invention involves forming a series of radiation-curable compositions wherein the radiation-curable composition may be useful for any one or more of a variety of uses including, for example, coatings on fiber optics and/or coatings which form part of fiber optic cable assemblies such as: primary, colored or uncolored outer primary coatings as well as other coatings including inks and matrix materials. The process involves (a) forming a pre-composition, (b) measuring an in-situ sample of said pre-composition to determine a property of the cured pre-composition and (c) adding at least one adjusting agent to form a radiation-curable composition (R1) and repeating this process (a)–(c) to form at least one further radiation-curable composition (R2) wherein said property value for each of said radiation-curable composition (R1) and said at least one further radiation-curable composition (R2) are each within a target value range for said property.

DETAILED DESCRIPTION OF PREFERRED EMBODIMENTS

Figure 1:
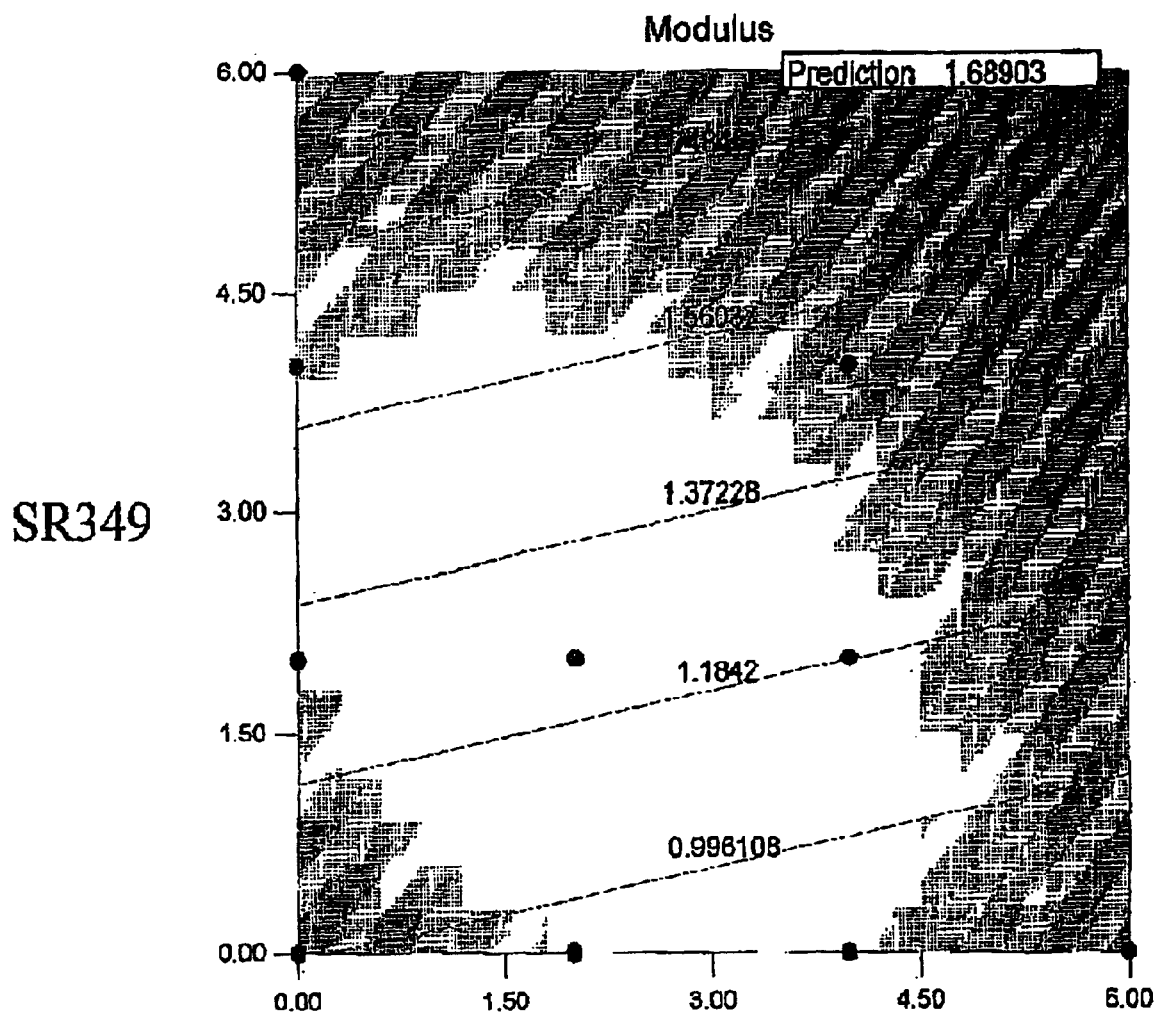
FIG. 1 is a graph of wt. % of monomer A (Ethoxylated Nonylphenol Acrylate) vs. wt. % of monomer B (bisphenol A Ethoxylated Diacrylate) and a series of contour lines representing predicted modulus values.

Herein certain terms are used to define elements of the present invention. Unless otherwise qualified, these terms are to be understood as having the meanings as defined below.

"Adjusting agent" refers to a monomer, oligomer or a mixture of both that has the intended effect of changing a property of a radiation-curable composition. Preferably, the adjusting agent will be one that is intended to change a property of the cured radiation-curable composition.

"Cure speed" refers to the amount of radiation in $J/cm^2$ required to achieve 95% of the ultimate secant modulus dose of a given sample as measured in accordance with the Test Procedure set forth below.

"In-situ sample" refers to a portion of a composition that has been cured to at least 95% of its full cure, more preferably at least 98% of its full cure, to measure a property of the composition, preferably before the composition is packed for storage, and more preferably before the composition is let out of the reactor.

"Modulus increasing component" refers to an adjusting agent that has the intended effect of increasing the modulus of a radiation-cured composition even though it may also alter another property of the composition such as the viscosity. Preferably, the modulus increasing component is a component that itself has a modulus greater than the pre-composition.

"Modulus reducing component" refers to an adjusting agent that has the intended effect of decreasing the modulus of a radiation-cured composition even though it may also alter another property of the composition such as the viscosity. Preferably, the modulus reducing component is a component that itself has a modulus lower than the pre-composition.

"Modulus/viscosity adjusting agent" refers to an adjusting agent that has the intended effect of altering both the modulus and viscosity of a radiation-curable composition.

"Monomer" refers to a radiation curable compound having a molecular weight of less than 750 g/mol, preferably less than 500 g/mol.

"Oligomer" refers to a radiation curable compound having a molecular weight of 750 g/mol or more, preferably 1,000 g/mol or more.

"Pre-mixture" refers to the identity of a particular ingredient at a point prior to its introduction (and possible interaction or reaction) with other ingredients in the composition.

The radiation-curable compositions of the present invention are not particularly limited by how they are prepared. Any conventional process and equipment suitable for this purpose may be employed. Blends of oligomers, monomer diluents, and other ingredients can be used to tailor properties by conventional means. A key characteristic of the present invention is the ability to formulate compositions that have uniformly consistent properties.

The method of the present invention involves steps (a) to (c). The first step (a) comprises preparing a pre-composition comprising a radiation-curable oligomer. For instance, a radiation-curable oligomer may be used as a pre-composition by itself. However, more typically, other components are added to a radiation-curable oligomer to form a pre-composition. Although a number of ingredients may be added to the radiation-curable oligomer to form the pre-composition, typically the ingredients selected are those which make the radiation-curable oligomer more manageable (i.e., easier to process and/or measure its properties). Preferably, the ingredients added to the radiation-curable oligomer will tend to lower the viscosity of the pre-composition and may also contribute to or impart a property or properties desired in the final composition.

Once the pre-composition is formed, step (b) comprises that an in-situ sample is prepared and measured to establish a property value of the cured composition. Based on the value of the measured property, step (c) comprises that the pre-composition is adjusted by adding a pre-determined amount of at least one adjusting agent to cause the particular property of the radiation-curable composition (R) to fall within the target value range. The property value measured and adjusted for may include any one or more properties of the cured composition that is desired to be controlled. This may include, for instance, cure speed, density, opacity, tensile strength, elongation, modulus (including, for example, secant, Young's, viscous, and elastic modulus), adhesion (including wet and dry), coefficient of friction, stability (including, for example, light, thermal, oxidative and hydrolytic stability), refractive index, glass transition (Tg), hydrogen generation, permeability, strippability, coefficient of thermal expansion, weight loss (including, for example, thermal and QUV), hardness, shrinkage, component content (including, for example, water), absorptivity, extractability, gel sensitivity, yellowness, haziness, abrasion resistance, crack propagation, and color. Preferred, property values include those which can be sample and measured in a relatively short time frame, for instance, less than 1 hour, preferably less than 10 minutes. These preferred tests include, for example, cure speed, modulus, tensile strength, elongation and Tg. In addition to these cured properties, the pre-composition may be measured to establish one or more properties of the uncured composition including, for example, viscosity, density, volatility, and opacity. The process of the present invention may be used to produce a series of radiation-curable composition (R1, R2 . . . having one or more properties of the radiation-curable composition that upon cure fall within a target value range and optionally one or more properties of the uncured composition which fall within a target value range. Preferably, the radiation-curable composition will have in addition to at least one controlled cured property value a cure speed of less than 1.0 J/cm$^2$, more preferable less than 0.7 J/cm$^2$ and more preferably less than 0.6 J/cm$^2$. In an even more preferred embodiment the cure speed is less than 0.2 J/cm$^2$. Generally, the cure speed will be 10 mJ/cm$^2$ or higher.

In a preferred embodiment of the present invention at least two properties are adjusted to fall within a target value range.

In practice, the pre-composition is preferably a radiation-curable composition comprising in addition to a radiation-curable oligomer, a monomer diluent and, typically, a photoinitiator. Preferably, the pre-composition is designed to have a viscosity higher than a target value and a modulus below a target value. Then, based on the measured value of the actual viscosity and modulus, it can be determined how much of one or more adjusting agents need to be introduced to form a final composition having properties at or within a limited about the target values.

The determination of the amount of adjusting agent to add can be determined in any number of ways suitable for this purpose including, for instance, empirically based on the specifics of the base system (or composition). For example, experiments could be conducted to prepare relative value graphs (e.g., FIGS. 1 & 2) which show the change in a given property value for a given change in amount of adjusting agent. Once the effect of a given adjusting agent is understood or at least predictable, it can be determined for a given actual property value or values the amount or amounts and type or types of adjusting agents to add (i.e., a pre-determined amount). For certain property values, the commercial literature for a given component may provide details about, for example, the viscosity, specific gravity and Tg for the component which may be indicative of the effect that component may impart to a given system.

For instance, a monomer diluent which typically functions to decrease the viscosity of the oligomer may also be used to trim properties of the composition and tailor the radiation-curable composition properties like, for example, refractive index and polarity (moisture absorption). For instance, it may be that aromatic diluents like phenoxyethyl acrylate or ethoxylated nonylphenol acrylate tend to raise the refractive index of the material. Aliphatic diluents like lauryl acrylate impart hydrophobicity, and diluents with long chain alkyl groups tend to soften the composition. Polar diluents like N-vinyl pyrrolidone can improve room temperature mechanical properties by hydrogen bonding. Multi-functional diluents like trimethylolpropane triacrylate can increase cure speed and crosslink density. Formulations can be tailored with non-polar diluents to minimize water absorption.

Figure 2:
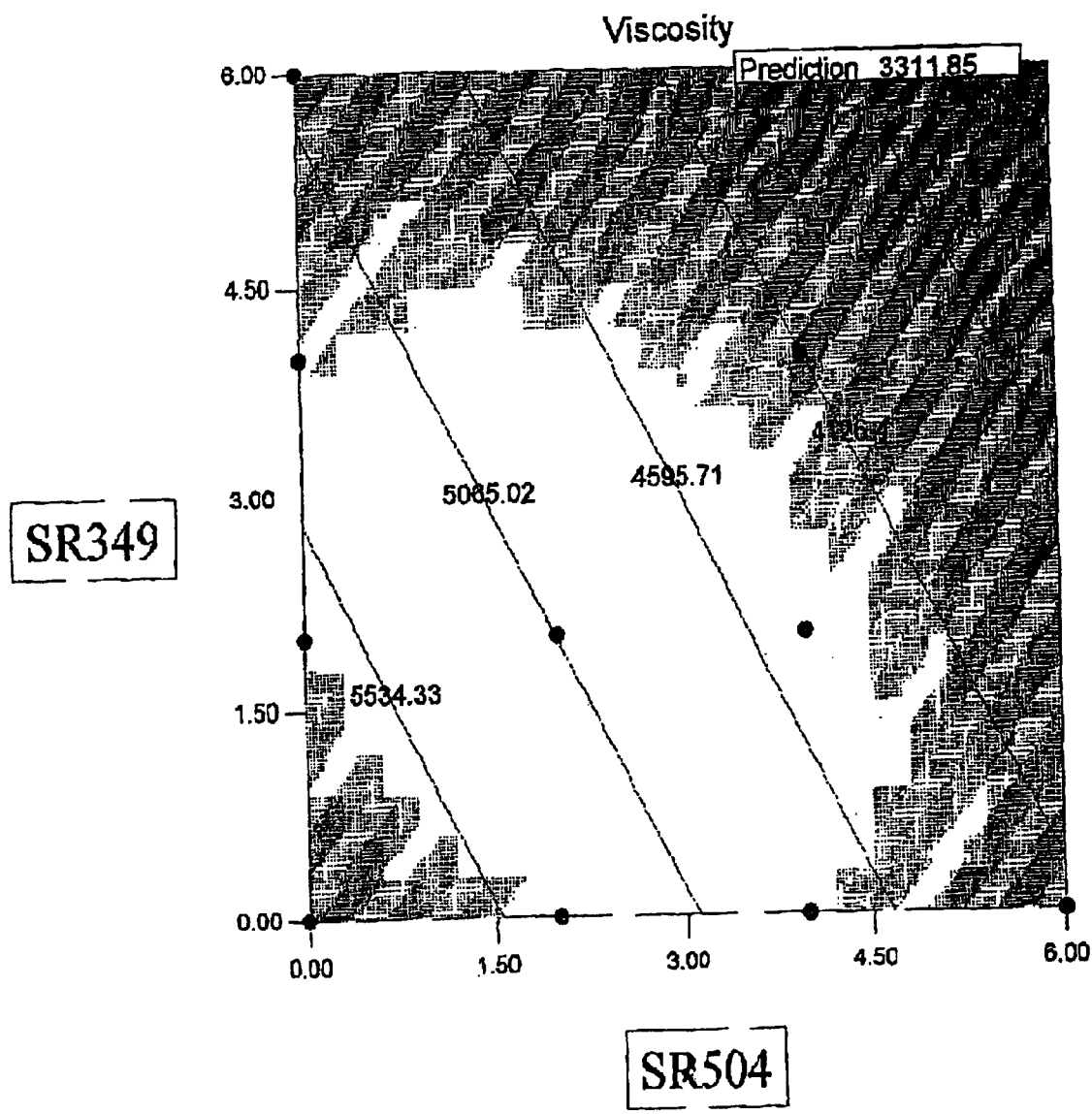
FIG. 2 is a graph of wt. % of monomer A (Ethoxylated Nonylphenol Acrylate) vs. wt. % of monomer B (bisphenol A Ethoxylated Diacrylate) and a series of contour lines representing predicted viscosity values.

For any given property, it can be determined and then measured what type of component and how much needs to be added based on the method employed in forming FIGS. 1–2. These graphs were developed by preparing a series of standard compositions and varying wt. % (i.e., 0–6 wt. % A vs. 0–6 wt. % B, as indicated by the points noted on FIGS. 1–2), relative to the total weight of the pre-composition, of at least one adjusting agent and measuring a particular property or properties. Specifically, in FIGS. 1–2, the properties measured included viscosity and modulus. This procedure can be repeated with a further series of standard compositions having a fixed amount of at least one other adjusting agent. This enables the effect of combined adjusting agents to be determined. From the measured values, the change in a given property for a given adjusting agent or set of agents can be predicted. In FIGS. 1–2 the predicted property value curves were developed by interpolating the values an engineering process modeling program (commonly referred to as Strategy). Preferably, the predicted property value curves are linear, in particular, over small ranges. The curves representing the predicted property values can be reduced to a mathematical equation and if two adjusting agents are being used to control two property values, the mathematical equations for each property value can be reduced to a single equation.

From the above procedure, a plurality of modulus increasing components and modulus decreasing components as well as modulus/viscosity adjusting components (which encompasses four kinds of agents including those that increase modulus and either increase or decrease viscosity, and those that decrease modulus and either increase or decrease viscosity) can be identified for a given system. It may be useful for any given set of adjusting agents that they be further characterized for their effect on other parameters that may not be controlled but nonetheless need to be monitored to keep from causing another property to be altered to an unacceptable value.

Although the effect a given adjusting agent may have on a given composition is a function of the properties of both the component and the composition (i.e., a component A added to a composition having a high modulus may lower the modulus but the same component A added to a low modulus composition may raise the modulus), generally for a given type of ultimate compositions, for instance, inner primary coating compositions for optical fibers, it is possible to establish classes of compounds that provide a given effect.

For compositions having relatively low modulus, preferably less than 10 MPa and a viscosity in the range of 3,500–9,000 mPa.s suitable viscosity adjusting agents may include, for example, monofunctional monomers such as alkoxylated nonylphenol acrylate (including, for instance, ethoxylated and propoxylated nonylphenol acrylate), isobutoxymethyl acrylamide, dicyclopentadiene acrylate and the like; and multifunctional monomer such as alkoxylated di and triacrylates including, for instance, alkoxylated bisphenol A diacrylates (including ethoxylated and propoxylated), trimethylolpropane alkoxylate triacrylate; and glycerylpropoxy triacrylate, and pentaerythritol triacrylate.

Examples of suitable viscosity decreasing agents may include monofunctional monomers such as alkyl, alkoxy, alkoxyalkyl acrylates including, for instance, butoxyethyl acrylate, butyl acrylate, cyclohexyl acrylate, hexyl acrylate, methoxyethyl acrylate; and dimethyl acrylamide, n-vinyl pyrrolidone, tetrahydrofurfuryl acrylate, acrylic acid and dialkylaminoethyl acrylate; and multifunctional monomers, including 1,3-butyleneglycol diacrylate, 1,6-hexanediol acrylate, and thiodiethyleneglycol diacrylate.

Many of these monomers may also be classified as good modulus reducing or increasing agents as well. Suitable modulus increasing agents may include, for example, acrylic acid, dicyclopentadiene acrylate, isobornyl acrylate, dimethyl acrylamide, vinyl caprolactam, and vinyl-2-pyrolidone; and multifunctional monomers butyleneglycol diacrylate, bisphenol A ethoxylate diacrylate, glycerylpropoxy triacrylate, 1,6-hexanediol diacrylate, pentaerythritol triacrylate, trimethylolpropane tri-β-carboxyethyl acrylate, thiodiethyleneglycol diacrylate, tris-hydroxyethylisocyanurate triacrylate, trimethylolpropane alkoxylated triacrylate, and trimethylolpropane triacrylate. Suitable modulus lowering agents may include, for example, monofunctional monomers such as alkoxylated nonyl phenol (including ethoxylated and propoxylated) butoxyethyl acrylate, butyl acrylate, dialkylaminoethyl acrylate (wherein alkyl includes methyl and ethyl), hexyl acrylate, isodecyl acrylate, isooctyl acrylate, lauryl acrylate, methoxyethyl acrylate, octyl-decyl acrylate, phenyl acrylate, ethoxyethoxyethyl acrylate, dicaprolactoneethyl acrylate; and multifunctional monomers such as poly(butanediol) diacrylate.

The controlled cured property value will typically be, relative to the target value, within a target value range of ±15% of the target value, preferably within ±10% of the target value, in particular when the target property value has an absolute value greater than 20, preferably greater than 100. For example, if the target value is 1,000, then a ±15% target value range, relative to the target value, would include values from 850 through 1,150. When the target property value is less than 20, a preferred target value range may include ±1.5% or less or within ±2 units, more preferably ±0.5 units, of the target value.

When the controlled property is modulus, measured in MPa units, the target value range is preferably ±0.4 MPa of the target value. For instance, the target value range may be between 0.9 and 1.3 MPa for compositions designed for use as inner primary coatings for fiber optics. For compositions designed for use as a secondary coating and/or inks for fiber optics, the modulus target value is more particularly above 100 up to 1,000 MPa whereas for matrix material compositions it is desirable to have a modulus between about 50 MPa to about 200 MPa. Accordingly, the modulus target value range for secondary coatings, inks and matrix materials is preferably ±10%, more preferably ±8%, of the target value. For cure speed measured in $J/cm^2$, the target value range is preferably within ±0.2 $J/cm^2$ of the target value range. It is preferred that the cure speed target value be 0.5 $J/cm^2$ or less. For Tg measured in 0° C., the target value range is preferably within ±5° C. of the target Tg. Preferably, the target Tg value will be between −30 and 100° C. When it is desired to additionally control an uncured property of the radiation-curable composition, it similarly should have a target value range between ±15%, more preferably ±10%, of the target value. For instance, when the controlled uncured property is viscosity measured in mPa.s, the target value range may be within ±1,000 mPa.s, preferably ±700 and more preferably ±500 mPa.s, of the target value. It is preferred that the target viscosity is between 5,000 and 10,000 mPa.s.

The radiation-curable compositions of the present invention are now described in more detail. Although the pre-composition comprises at least one radiation-curable oligomer, depending on the requirements for the particular radiation-curable composition and the inherent properties of the oligomer, it typically will include other components including additional radiation-curable oligomers, one or more monomer diluents, and additives, in particular, at least on photoinitiator. The adjusting agents may include some of the same components used to form the pre-composition. In particular, the adjusting agents will include some of the same or similar monomer diluents that are suitable for use in the formation of the pre-composition.

(A) Radiation-Curable Oligomer

The radiation-curable oligomer useful in the pre-compositions, and ultimately in the radiation-curable compositions, is a reaction product mixture (herein "radiation-curable oligomer"), composed of one or more types of polymers having urethane bonds in a molecular chain such that the oligomer compound, or mixture of such oligomer compounds, have on average 1.2 or more, preferably from 1.5 or more polymerizable unsaturated functional groups. The number of polymerisable groups is preferably about 4 or less, and more preferred 3.5 or less and particularly preferred about 2.5 or less per oligomer compound. The polymerizable unsaturated functional group preferably includes radically polymerizable ethylenically unsaturated groups, for example, (meth)acrylate, vinyl ether, vinyl, acrylamide, maleate, fumarate, and the like. The preferred ethylenically unsaturated groups are (meth)acrylate, with acrylate groups being most preferred.

The oligomers used among the series of radiation-curable compositions may include oligomers drawn from the same batch and/or those produced in different batches using the same formulations. It may be that the oligomers employed between two or more compositions in the series include out-of-specification oligomers and/or out-of-specification oligomers mixed with others to be brought into specification provided the ultimate radiation-curable composition meets or exceeds the same specification in all respects including the target value range of the controlled property or properties.

Useful oligomers include those which contain two or more urethane bonds, and preferably 2–10 urethane bonds. If the number of urethane bonds is less than two, the tenacity of the resulting cured product decreases, which tends to produce a transmission loss of optical fiber when the composition is used as a coating material for optical fibers.

The principal chain, or backbone, of suitable oligomers include those constituted of a wide variety of polymers including those derived from polyether polyols, polyester polyols, polycaprolactone polyols, polyolefin (hydrocarbon) polyols, polycarbonate polyols and the like. These polyols may be used either singly or in combinations of two or more and linked by variety of means including urethane linkages. It is especially desirable that the component (A) contains a polyether urethane-based oligomer including, in particular, those comprising polycarbonate- and polyether-groups. In this case, either all or a part of the component (A) may be a polyether urethane-based oligomer.

The oligomers useful as the component (A), include those composed of a polyether urethane-based polymer as a basic structure, produced by reacting (a) a polyether polyol (hereinafter called "polyether polyol (a)") obtained by a ring-opening reaction of an alkylene oxide, (b) a polyisocyanate (hereinafter called "polyisocyanate (b)"), and (c) a compound (hereinafter called "compound (c)") containing both of active hydrogen capable of reacting with the isocyanate group and a polymerizable unsaturated group.

The above polyether polyol (a) is a polyol possessing a polyoxyalkylene structure composed of a polyoxyalkylene group having 2–10 carbon atoms as a repetitive unit and is preferably a diol.

Given as examples of diols possessing the above polyoxyalkylene structure are polyglycol compounds such as polyethylene glycol, polypropylene glycol, polytetramethylene glycol, polyhexamethylene glycol, polyheptamethylene glycol, polydecamethylene glycol, and the like; and polyether diols obtained by ring-opening copolymerization of two or more ionic polymerizable cyclic compounds.

Examples of ion-polymerizable cyclic compounds include cyclic ethers such as ethylene oxide, propylene oxide, butene-1-oxide, isobutene oxide, 3,3-bischloromethyl oxetane, tetrahydrofuran, 2-methyl tetrahydrofuran, 3-methyl tetrahydrofuran, dioxane, trioxane, tetraoxane, cyclohexene oxide, styrene oxide, epichlorohydrin, glycidyl methacrylate, glycidyl acrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate, with cyclic ethers such as ethylene oxide and tetrahydrofuran.

Also, polyether diols produced by ring-opening copolymerization of the above ion-polymerizable cyclic compound and a cyclic imine such as ethylene imine or the like, a cyclic lactone such as p-propiolactone or glycolic acid lactide or the like, or cyclic siloxanes such as dimethylcyclopolysiloxane or the like can be used.

Examples of the specific combinations of two or more ion-polymerizable cyclic compounds include combinations of tetrahydrofuran and propylene oxide, tetrahydrofuran and 2-methyl tetrahydrofuran, tetrahydrofuran and 3-methyl tetrahydrofuran, tetrahydrofuran and ethylene oxide, and propylene oxide and ethylene oxide. Two or more ion-polymerizable cyclic compounds may be combined at random in the resulting ring-opening polymer.

The aforementioned diols having a polyoxyalkylene structure are commercially available under the trademarks, for example, PTMG1000, PTMG2000 (manufactured by Mitsubishi Chemical Corp.), PPG1000, PPG2000, EXCENOL2020, EXCENOL1020 (manufactured by Asahi Oline Co., Ltd.), PEG1000, Unisafe DC1100, Unisafe DC1800 (manufactured by Nippon Oil and Fats Co., Ltd.), PPTG2000, PPTG1000, PTG400, PTGL 2000 (manufactured by Hodogaya Chemical Co., Ltd.), and the like.

In the foregoing production, a diol having no polyoxyalkylene structure and/or a diamine may be used either individually or in combination with the polyether polyol (a). Here, as examples of a diol having no polyoxyalkylene structure, a polyester diol, polycaprolactone diol, polycarbonate diol, and the like are given. Examples of a polyester diol include polyester diols obtained by reacting polyhydric alcohol such as ethylene glycol, propylene glycol, tetramethylene glycol, 1,6-hexane diol, neopentyl glycol, or 1,4-cyclohexanedimethanol with a polybasic acid such as phthalic acid, isophthalic acid, terephthalic acid, maleic acid, fumaric acid, adipic acid, sebacic acid, or the like. Examples of a polycaprolactone diol include polycaprolactone diols obtained by reacting ε-caprolactone diol with a diol such as ethylene glycol, tetramethylene glycol, 1,6-hexane diol, neopentyl glycol, 1,4-butane diol, or the like. As examples of the polycarbonate diol, a polycarbonate diol of polytetrahydrofuran, polycarbonate of 1,6-hexane diol, and the like are given. These polycarbonate diols are commercially available under the trademarks DN-980, DN-981, DN-982, DN-983 (manufactured by Nippon Polyurethane Industry Co., Ltd.), PC-8000 (manufactured by PPG in US), and the like. Exemplary polyolefin diols include preferably linear or branched hydrocarbons containing a plurality of hydroxyl end groups. Preferably, the hydrocarbon is a non-aromatic compound containing a majority of methylene groups (—$CH_2$—) and which can contain internal unsaturation and/or pendent unsaturation. Fully saturated, for example, hydrogenated hydrocarbons, are preferred because the long term stability of the cured coating increases as the degree of unsaturation decreases. Examples of hydrocarbon diols include, for example, hydroxyl-terminated, fully or partially hydrogenated 1,2-polybutadiene; 1,4- and 1,2-polybutadiene copolymers, 1,2-polybutadiene-ethylene or-propylene copolymers, polyisobutylene polyol; mixtures thereof, and the like. Preferably, the hydrocarbon diol is a substantially hydrogenated or fully hydrogenated 1,2-polybutadiene or 1,2-polybutadiene-ethene copolymer.

The aforementioned polyisocyanate (b) is a compound containing 2–6 isocyanate groups with diisocyanates being preferred. Specific examples of the polyisocyanate (b) include 2,4-tolylene diisocyanate, 2,6-tolylene diisocyanate, 1,3-xylene diisocyanate, 1,4-xylene diisocyanate, 1,5-naphthalene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexylmethane diisocyanate, methylenebis(4- cyclohexylisocyanate), hydrogenated diphenylmethane diisocyanate, 2,2,4-trimethylhexamethylene diisocyanate, bis (2-isocyanatoethyl) fumarate, 6-isopropyl-1,3-phenyl diisocyanate, 4-diphenylpropane diisocyanate, lysine diisocyanate, and the like.

The above-noted compound (c) having an active hydrogen and a polymerizable unsaturated group, may include, for example, (meth)acryl type compounds having at least one hydroxyl group. Specific examples of the compound (c) include 2-hydroxyethyl (meth)acrylate, 2-hydroxypropyl (meth)acrylate, 2-hydroxyoctyl (meth)acrylate, pentaerythritol tri(meth)acrylate, glycerol di(meth)acrylate, dipentaerythritol monohydroxy penta(meth)acrylate, 1,4-butanediol mono(meth)acrylate, 4-hydroxycyclohexyl (meth)acrylate, 1,6-hexanediol mono(meth)acrylate, neopentyl glycol mono(meth)acrylate, trimethylolpropane di(meth)acrylate, trimethylolethane di(meth)acrylate, and (meth)acrylates represented by the following formulae (1) and (2):

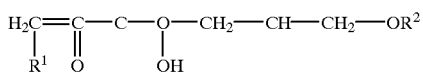

(1)

wherein
$R^1$ represents a hydrogen atom or a methyl group, and
$R^2$ represents a hydrogen atom or an alkyl, aryl, hydroxyalkyl, or hydroxyaryl group.

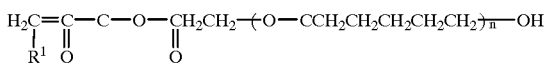

(2)

wherein $R^1$ is the same as defined above and n denotes an integer from 1 to 5. Among these groups, 2-hydroxylethyl (meth)acrylate is preferred.

Radiation-curable oligomers (A) may be prepared by reacting at least one polyol (a) with at least one polyisocyanate (b) and at least one compound (c) in accordance with procedures and in proportions known for forming such reactions. For instance, it is common in these types of reactions to use a urethanization catalyst such as copper naphthanate, cobalt naphthanate, zinc naphthanate, dibutyltin dilaurate, triethyl amine, 1,4-diazabicyclo[2.2.2]octane, 2,6,7-trimethyl-1,4-diazabicyclo[2.2.2]octane, or the like in an amount of 0.01 to 1 part by weight of 100 parts of the total amount of reaction components. This reaction may be carried out at any suitable temperature. Typically, this reaction is performed at a temperature of 10 to 90° C., and preferably 30 to 80° C.

The oligomer which is the component (A) preferably contains a polyether polyol urethane-based polymer. The component (A) may either be composed entirely of polyether polyol urethane-based polymers or include polyether polyol urethane-based polymers as a major component as well as other polymers corresponding to the component (A). Examples of other oligomers suitable for use as component (A) include polyester urethane-based oligomers, polycaprolactone urethane-based oligomers, polyether-polycarbonate urethane oligomers and the like.

The proportionate amount of the component (A) polymer in the composition of the present invention is generally from 25 to 75% by weight, and preferably from 40 to 70% by weight. If the proportion of the component (A) is too small, the elongation of the resulting cured product from the composition decreases, whereas if the proportion is too large, the viscosity of the composition increases, whereby the handling characteristics tend to be impaired.

The synthetic methods disclosed herein can be used to prepare oligomers for inner primary coatings, outer primary coatings, inks, matrix materials, and other materials. Such coatings are disclosed in, for example, U.S. Pat. Nos. 4,522,465 and 4,514,037 to Bishop et al. U.S. Pat. No. 4,806,574 to Krajewski et al. discloses methods for tailoring the molecular architecture of the oligomer by, for example, use of polyfunctional cores. U.S. Pat. No. 5,093,386 to Bishop et al. and U.S. Pat. No. 4,992,524 to Coady et al., disclose synthetic strategies for preparing radiation-curable oligomer for optical fiber coatings. Each of these references teach how to prepare suitable urethane ethylenically-unsaturated oligomers, in particular, urethane (meth)acrylate oligomers.

The number average molecular weight of the oligomer is not particularly limited but can be, for example, about 750–10,000 g/mol, and preferably, about 1,000–5,000 g/mole. Molecular weight can be selected to achieve the desired viscosity, modulus, solvent resistance, oxidative stability, and other important properties. Oligomer molecular weight and its distribution can be determined by gel permeation chromatography.

The oligomer can be present, relative to the total pre-composition, in amounts between 10 and 100 wt. %, and preferably, between 10 and 90 wt. %, and more preferably, between 25 and 80 wt. %. The person skilled in the art can tailor the oligomer amount in view of the end requirements. Oligomer levels can be adjusted depending on the particular application. The oligomer amount in the ultimate radiation-curable composition, relative to the total radiation-curable composition, is typically between 10 and 90 wt. %, preferably, between 25 and 80 wt. %, and more preferably, between 40 and 75 wt. %.

(B) Monomer Diluent

The pre-compositions and the ultimate radiation-curable compositions according to the invention may comprise one or more monomer diluents. Typically, the monomer diluent may be included into the pre-composition to adjust the viscosity of the pre-composition and the ultimate radiation-curable composition. In addition, the same or different monomer diluents may be added to the pre-composition to form the ultimate radiation-curable composition with a property value within a specified target value range. Thus, monomer diluents typically include compounds that tend to effect at least one property value of the composition and/or contain at least one functional group capable of polymerization when exposed to actinic radiation.

The monomer diluent of the invention is selected to be one that is compatible with the oligomers. Depending on the particulars of the composition, this may mean that the radiation-curable functional group present on the monomer diluent is the same or different than that used in the radiation-curable oligomer. Preferably, the radiation-curable functional group present in the monomer diluent is capable of copolymerizing with the radiation-curable functional group present on the radiation-curable oligomer. Monomer diluents with ethylenic unsaturation (including, for example, acrylate, methacrylate and/or vinyl) is preferred. In particular, acrylate unsaturation is preferred.

The monomer diluent is preferably added in such an amount that the viscosity of the pre-composition is in the range of about 1,000 to about 10,000 mPa.s. Preferably, the viscosity of the pre-composition is higher than the target viscosity for the radiation-curable composition. The amount of monomer diluent present in the pre-composition, relative to the total pre-composition, will range from 0 to 90 wt. % more typically the amount will between 10 and 90 wt. %, preferably between 20 and 80 wt. %, and more preferably, between 30 and 70 wt. %. The total amount of monomer diluent in the ultimate radiation-curable composition, relative to the total radiation-curable composition, will typically be between 10 and 90 wt. %, preferably, between 25 and 80 wt. %, and more preferably, between 40 and 75 wt. %.

Depending on the parameters of the specific composition, any suitable monomer diluent may be used, including some lower weight oligomers. Suitable acrylate monomers include: $C_2$–$C_{18}$ hydrocarbondioldiacrylates, $C_4$–$C_{18}$ hydrocarbondivinylethers, $C_3$–$C_{18}$ hydrocarbontrioltriacrylates, the polyether analogs thereof, and the like, including, for example, 1,6-hexanedioldiacrylate, trimethylolpropanetriacrylate, hexanedioldivinylether, triethyleneglycoldiacrylate, pentaerithritoltriacrylate, tripropyleneglycol diacrylate alkoxylated bisphenol A diacrylate.

Suitable examples of monomer diluents also include, but are not limited to, aromatic-containing monomers such as phenoxyalkyl acrylates or methacrylates (e.g., phenoxyethyl (meth)acrylate); phenoxyalkyl alkoxylate acrylates or methacrylates (e.g., phenoxyethyl ethoxylate (meth)acrylate or phenoxyethyl propoxylate(meth)acrylate); or one of any other such monomer diluents suitable for use with such compositions. Combinations including one or more of these are suitable as well. Such monomer diluents belonging to the later category are disclosed and described in U.S. Pat. No. 5,146,531 and may, for example, contain (1) an aromatic moiety; (2) a moiety providing a reactive (e.g., acrylic or methacrylic) group; and (3) a hydrocarbon moiety.

Examples of aromatic monomer diluents additionally containing hydrocarbon character and a vinyl group include but are not limited to polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; alkoxylated nonylphenol acrylates such as ethoxylated nonyl phenol acrylate; and mixtures of these.

Such monomers are, for example, available from Toagasei Chemical Industry Company, Ltd., Tokyo, Japan under the trade names ARONIX M111, M113, M114 and M117, Henkel Corporation, Ambler, Pa., under the trade name PHOTOMER 4003, and Sartomer under the tradename SR-504.

Other suitable monomer diluents additionally include hydrocarbon alkyl acrylates or methacrylates which are either straight chain or branched, and may contain 2 to 18 carbon atoms in the alkyl moiety including, for example, hexyl acrylate; hexyl methacrylate; ethylhexyl acrylate; ethylhexyl methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; $C_{14}$–$C_{15}$, hydrocarbon diol diacrylates; $C_{14}$–$C_{15}$ hydrocarbon diol dimethacrylates; and mixtures of the above. Of these, octyl, decyl, isodecyl and tridecyl acrylates are preferred.

Also suitable are cyclic monomers such as isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; tetrahydrofurfuryl acrylate; tetrahydrofurfuryl methacrylate; and mixtures thereof.

If the radiation-curable functional group of the radiation-curable oligomer is an epoxy group, for example, one or more of the following compounds may be used, or additional used, as the monomer diluent: epoxy-cyclohexane, phenylepoxyethane, 1,2-epoxy-4-vinylcyclohexane, glycidylacrylate, 1,2-epoxy-4-epoxyethyl-cyclohexane, the diglycidylether of polyethylene-glycol, the diglycidylether of bisphenol-A, and the like.

If the radiation-curable functional group of the radiation-curable oligomer has an amine-ene or thiol-ene system, examples of monomer diluents having allylic unsaturation may be used, or additionally used, which include: diallylphthalate, triallyltri-mellitate, triallylcyanurate, triallylisocyanurate, and diallylisophthalate. For amine-ene systems, amine functional diluents that can be used include, for example: the adduct of trimethylolpropane, and di(m)ethylethanolamine, the adduct of hexanediol, and dipropylethanolamine, and the adduct of trimethylol propane, and di(m)ethylethanolamine.

Of course, it will be appreciated any one or more of these types of monomer diluents may be used including mixture comprising these diluents and systems with diluents mixed with other oligomers.

(C) Additives

The radiation-curable composition and pre-composition may optional include numerous other suitable additives depending on the particulars of the application for which the composition is designed for. Any additives used may be introduced into either the pre-composition or radiation-curable composition, with the pre-composition being preferred, in effective amounts. The total amount of additives present in these composition is typically between 0 and 30 wt. %, relative to the total weight of the pre-composition and/or radiation-curable composition. For example, slip agents may be used to reduce the coefficient of friction and thermal antioxidants may be used to improve oxidation and thermal stability. Silane coupling agents may be used to improve adhesion between, for example, the cured composition and optical fiber surface. Other additives include stabilizers to prevent gellation, UV screening compounds, leveling agents, polymerization inhibitors, light stabilizers, chain transfer agents, colorants including pigments and dyes, plasticizers, fillers, wetting improvers, preservatives, and the like. Other polymers and oligomers can be added to the compositions.

For instance, the composition may include a silane coupling agent as an additive, for example, a hydrolyzable alkoxy silane compound, which is functionalized so that it can covalently bind with the network at some point before or during radiation-cure. Conventional silane adhesion promoters can be used. Functional groups for binding include mercapto, vinyl, acrylate, methacrylate, acrylamido, amino, and the like. A preferred silane coupling agent is gamma-mercaptopropyltrimethoxysilane. The adhesion promoter can be present in amounts of less than 10%, preferably, from 0.3 and 8 wt. %, and more preferably, from about 0.5 and 4 wt. %, relative to the total weight of either the pre-composition and/or radiation-curable composition.

Optional additives may include a photoinitiator. Of course, the photoinitiator does not have to be included in the pre-composition as it may be added only to the ultimate radiation-curable composition but it is preferred that it be added to the pre-composition, prior to the in-situ measurement. The necessity for this component depends on the envisioned mode of cure of the composition: if it is to be ultraviolet cured, a photoinitiator is needed; if it is to be cured by an electron beam, the material may comprise substantially no photoinitiator.

In the ultraviolet cure embodiment, the photoinitiator, when used in a small but effective amount to promote radiation cure, must provide reasonable cure speed without causing premature gelation of the composition. Further, it must not interfere with the optical clarity of the cured coating. Still further, the photoinitiator must itself be thermally stable, non-yellowing, and efficient.

Suitable photoinitiators include, but are not limited to, the following: hydroxycyclohexylphenyl ketone; hydroxymethyl-phenylpropanone; dimethoxyphenylacetophenone; 2-methyl-1-4-methyl (thio)phenyl-2-morpholino-propanone-1,1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethyoxyacetophenone; 2,2-di-sec-butoxyacetophenone; diethoxy-phenyl acetophenone; and mixtures of these.

A preferred class of photoinitiators are the triacylphospine oxides, such as trimethylbenzoyldiphenylphosphine oxide (available from BASF Corp., Chemicals Division, Charlotte, N.C. as LUCIRIN TPO) trimethylbenzoylethoxyphenylphosphine oxide (available from BASF as LUCIRIN 8893); bis-(2,6-dimethoxybenzoyl)-2,4,4-trimethylpentyl phosphine oxide (available from Ciba-Geigy Corp., Ardseley, N.Y.); and mixtures thereof.

The photoinitiator, when used, should be used at a level such that a cure speed, as measured in a dose versus modulus curve, of less than 0.7 $J/cm^2$, and preferably less than 0.5 $J/cm^2$, is obtained. Typically, the pre-composition, relative to the total weight of the pre-composition, will comprise from 0.5 to 10.00 wt. % and the ultimate radiation-curable composition, relative to the total radiation-curable composition, will comprise about the same weight percent of photoinitiator. Preferably, the amount of photoinitiator is from 1.0 to 8.0 wt. %, relative to the total weight of the pre-composition, and 1.0 to 6.0 wt. % in ultimate radiation-curable composition, relative to the total radiation-curable composition.

The radiation-curable compositions of the present invention produced by the present invention may be formulated for a wide variety of purposes. The radiation-curable compositions discussed herein can readily be formulated for use, inter alia, in any one of several coating layers present in a ribbon assembly. These include the inner and outer primary coatings (which may or may not include coloring) on the optical fibers as well as other coatings including inks and matrix materials.

Using the process of the present invention, compositions may be formulated to have, after cure, a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for inner primary coatings for fiber optics. In contrast, suitable compositions for outer primary coatings, inks and matrix materials generally have a modulus of above 50 MPa, with outer primary coatings tending to have a modulus more particularly above 100 up to 1,000 MPa and matrix materials tending to be more particularly between about 50 MPa to about 200 MPa.

Elongation and tensile strengths of these materials can also be optimized depending on the design criteria for a particular use. For cured coatings formed from radiation-curable compositions formulated for use as an inner primary coating on optical fibers, the elongation is typically greater than 100%, more preferably the elongation is at least 110%, more preferably at least a 120%. Thermal mechanical measurements can be used to optimize the glass transition temperature (Tg) which may be from 10° C. down to −70° C. or lower for compositions formulated for use as inner primary coatings and 300° C. to 120° C. or higher, more preferably above 40° C., for compositions designed for use as outer primary coatings, inks and matrix materials.

The radiation-curable composition of the present invention may be formulated such that their target $\Delta E$ value range is within ±5, preferably ±3, wherein the target $\Delta E$ value is not greater than 25, more preferably not more than 20 and most preferably not more than 15, when exposed to low intensity fluorescent light for a period of 10 weeks. Typically, primary coatings are formulated so they have low water sensitivity and optimized adhesion for ribbon and loose-tube fiber assembly applications. Their target refractive index should be preferably at least about 1.48. Outer primary coating compositions are formulated to have low hydrogen generation and are relatively haze free.

The radiation-curable compositions of the present invention can be formulated for use as colored UV-curable ink compositions which are color stable. Thin layers of these inks can be coated onto the coated optical fiber to for identification purposes. UV-curable inks are discussed in, for example, "Ultraviolet Color Coding of Optical Fibers—a Comprehensive Study" by S. Vannais and J. Reese in *Wire Journal International*, October 1991, pgs. 71–76. In addition, color change of UV-cured inks is discussed in the publication by D. Szum in *Polymers Paint Colour Journal*, Nov. 24, 1993, Vol. 183, pgs. 51–53, Colored optical fiber materials are also disclosed in JP 64-22975 and JP-64-22976.

The compositions of the present invention can be formulated as colored outer primary coating. The formulation of typical coatings are disclosed in WO 90/13579. The compositions disclosed therein comprise pigment having particle size less than about one micron and acyl phosphine oxide photoinitiator. Conventional colorants, dyes, and pigments can be used having conventional colors. Pigments are preferred over dyes because dye color tends to fade with time. Pigments can be conventional inorganic or organic pigments as disclosed in, for example, *Ullmann's Encyclopedia of Industrial Chemistry*, 5th Ed., Vol. A22, VCH Publishers (1993), pages 154–155. The pigment can be selected based on, for example, whether the composition is an ink or an outer primary coating. Inks will be more heavily pigmented.

The colored material can comprise oligomers, at least one monomer diluent, photoinitiators, and additives, as disclosed herein for substantially colorless coatings but adapted to be an ink binder, a colored outer primary coating, a colored matrix material, or the like. General classes of suitable colorants include, among others, inorganic white pigments; black pigments; iron oxides; chromium oxide greens; iron blue and chrome green; violet pigments; ultramarine pigments; blue, green, yellow, and brown metal combinations; lead chromates and lead molybdates; cadmium pigments; titanate pigments; pearlescent pigments; metallic pigments; monoazo pigments; diazo pigments; diazo condensation pigments; quinacridone pigments; dioxazine violet pigment; vat pigments; perylene pigments; thioindigo pigments; phthalocyanine pigments; and tetrachloroisoindolinones; azo dyes; anthraquinone dyes; xanthene dyes; and azine dyes.

More in particular, suitable inorganic pigments for inks and outer primary coatings include, for example, titanium dioxide, iron oxide, iron silicate, iron cyan blue (or Prussian blue), aluminum powder, cooper-zinc allow powder, and carbon black. Suitable organic pigments for inks include, for example, diarylide yellow, diarylide orange, naphthol AS red, Rubin 4 B calcium salt, salts of basic dyes, phthalocyanine blue, reflex blue, phthalocyanine green, and polycyclic pigments. Fluorescent pigments can be used.

The amount of the colorant, pigment, or dye required will be determined by such factors as the shade, coloring strength, and fastness of the colorant as well as the dispersibility, rheological properties, and transparency. Also, inks are generally more heavily pigmented than outer primary coatings. The amount can be that which is sufficient to impart the required color, and more than that is not generally preferred. The amount of colorant can be, for example, between about 0 wt. % and about 25 wt. %, and preferably, about 0.25 wt. % and about 15 wt. %, and more preferably, between about 0.5 wt. % and about 5 wt. %.

A preferred type of ink composition is the Cablelite LTS UV-curable ink series commercially available from DSM Desotech, Inc. (Elgin, Ill.). Conventional fillers and extenders can be used with the colorants, pigments, and dyes.

Ribbon assemblies comprising one or more coatings formed from the process of the present invention can be advantageously used in various telecommunication systems. Such telecommunication systems typically include ribbon assemblies containing optical glass fibers, in combination with transmitters, receivers, and switches. The ribbon assemblies containing the coated optical glass fibers are the fundamental connecting units of telecommunication systems. The ribbon assembly can be buried under ground or water for long distance connections, such as between cities. The ribbon assembly can also be used to connect directly to residential homes.

The ribbon assembly made with the uniformly consistent compositions of this invention can also be used in cable television systems. Such cable television systems typically include ribbon assemblies containing optical glass fibers, transmitters, receivers, and switches. The ribbon assemblies containing the coated optical glass fibers are the fundamental connecting units of such cable television systems. The ribbon assembly can be buried under ground or water for long distance connections, such as between cities. The ribbon assembly can also be used to connect directly to residential homes.

The ribbon assemblies comprising compositions formed from the method of the present invention can also be used in a wide variety of technologies, including but not limited to, various security systems, data transmission lines, high density television, and computer appliance systems. It will be appreciated that the ability to control and consistently provide compositions having specific properties offers radiation-curable composition to for use in new areas as well as more uniformly consistent compositions in more traditional areas.

EXAMPLES

The following examples are given as particular embodiments of the invention and to demonstrate the practice and advantages thereof. It is understood that the examples are given by way of illustration and are not intended to limit the specification or the claims that follow in any manner.

Two processes were used to prepare a first and a second series of radiation-curable compositions having a target modulus of 1.1 MPa, and a target viscosity of 5,000 mPa.s while maintaining a cure speed below 1 $J/cm^2$. Both series of compositions were prepared by first preparing a series of pre-compositions from ingredients as shown in Table I. Each batch was prepared from a different polyether-polycarbonate aliphatic urethane acrylate oligomer batch. The viscosity of the pre-composition was measured and recorded as the initial viscosity. An in-situ sample of the pre-composition was cured to enable measurement of the modulus which was recorded as the initial modulus. Once the initial viscosity and modulus was determined, the pre-compositions were correspondingly adjusted in the first series by using a single adjusting agent while in the second series a combination of two adjusting agents were used to adjust the modulus and the viscosity. Finally, the viscosity and modulus were again measured. The experimental results for these series of radiation-curable compositions is presented in Table 2, below.

TABLE 1

| COMPONENTS | PRE-COMPOSITION |
| --- | --- |
| Polyether-polycarbonate Aliphatic Urethane Acrylate Oligomer (hereinafter "Oligomer") | 64.0 |
| Ethoxylated Nonylphenol Acrylate | 31.5 |
| Irgacure-1700[1] | 3.0 |
| Irganox-1035[2] | 0.5 |
| γ-Mercaptopropyl Trimethoxy Silane | 1.0 |

TABLE NOTES:
[1](IRGACURE-1700) = a 25:75 blend of (2,6-dimethoxy-benzoyl)-2,4,4-trimethylpentyl phosphine oxide and 2-hydroxy-2-methyl-1-phenylpropan-1-one (Ciba-Geigy).
[2](IRGANOX-1035) = Thiodiethylene-bis-(3,5-di-tert-butyl-4-hydroxy) hydrocinnamate (Ciba-Geigy).

TABLE 2

| | VISCOSITY (mPa · s) | | | MODULUS (MPa) | | | | | |
| --- | --- | --- | --- | --- | --- | --- | --- | --- | --- |
| Batch No. | Initial | Final | Difference Between Final vs. Target | Initial | Final | Difference Between Final vs. Target | Adjusting Agent[1] (wt %) | Adjusting Agent[2] (wt %) | Cure Speed ($J/cm^2$) |
| A-1 | 4,850 | 4,610 | 7.8% | 0.87 | 1.1 | 0% | 1.4 | 0 | 0.6 |
| A-2 | 4,780 | 4,400 | 12.0% | 0.78 | 1.1 | 0% | 1.9 | 0 | 0.5 |
| A-3 | 4,690 | 4,380 | 12.4% | 0.93 | 1.0 | 9% | 0.3 | 0 | 0.4 |
| A-4 | 4,000 | 3,790 | 24.2% | 0.87 | 1.1 | 0% | 1.4 | 0 | 0.5 |
| A-5 | 4,790 | 4,620 | 7.6% | 0.85 | 1.2 | 9% | 1.5 | 0 | 0.6 |
| B-1 | 5,080 | 4,950 | 1.0% | 1.00 | 1.2 | 9% | 1.5 | 0.2 | 0.5 |

TABLE 2-continued

| Batch No. | VISCOSITY (mPa · s) | | | MODULUS (MPa) | | | Adjusting Agent[1] (wt %) | Adjusting Agent[2] (wt %) | Cure Speed (J/cm²) |
|---|---|---|---|---|---|---|---|---|---|
| | Initial | Final | Difference Between Final vs. Target | Initial | Final | Difference Between Final vs. Target | | | |
| B-2 | 5,530 | 4,800 | 4.0% | 0.94 | 1.0 | 9% | 0.6 | 2.3 | 0.6 |
| B-3 | 5,200 | 4,860 | 2.8% | 0.82 | 1.1 | 0% | 1.5 | 1.1 | 0.4 |
| B-4 | 5,350 | 4,880 | 2.4% | 0.87 | 1.1 | 0% | 1.4 | 1.4 | 0.4 |

TABLE NOTES:
[1]BPAEDA = bisPhenol A Ethoxylated Diacrylate
[2]SR-504 = Ethoxylated Nonyl Phenol Acrylate (Sartomer)

The amounts of adjusting agents to be added are determined from FIGS. 1–2. FIGS. 1–2 were prepared by adding a fixed amount of each of monomer A (Ethoxylated Nonylphenol Acrylate) and monomer B (bisphenol A Ethoxylated Diacrylate) and measuring the modulus and viscosity. The measured values indicated by the points on the respective graphs along with the measured property values were entered into the engineering modeling program Strategy (licensed from Experimental Strategies Foundation) and a series of predicted modulus and viscosity value contour lines were developed (as shown on FIGS. 1&2). From these the following modulus and viscosity prediction equations can be developed.

$$\text{viscosity} = 6003.54 - 302.29(\text{wt. \% of monomer A}) - 167.02(\text{wt. \% of monomer B})$$

$$\text{Modulus} = 1.00 - 0.033(\text{wt. \% monomer A}) + 0.16(\text{wt. \% of monomer B})$$

These equations can be mathematical solved for $\Delta$viscosity and $\Delta$modulus ($\Delta$ represents target property value— measured property value of the pre-composition). The pre-determined amount of adjusting agent is calculated from the measured and target values from the following equations:

$$\Delta\text{viscosity} = -302.29(\text{wt. \% monomer A}) - 167.02(\text{wt. \% monomer B})$$

$$\Delta\text{modulus} = -0.033(\text{wt. \% monomer A}) - 0.16(\text{wt. \% monomer B})$$

TEST PROCEDURES

Viscosity

Viscosity of the composition, prior to curing, was measured at 25° C. using a Physica MC10 with a Z3 Spindle @ Shear Rate of 50 s$^{-1}$.

Cure Speed

Cure speed in the present invention was measured with use of FTIR spectral analysis; the results being measured by relative absorbance units of C═C as a function of exposure time. Cure speed was determined by Dose vs. Modulus curve analysis of radiation-cured sample films of approximately 75 microns thickness which were cured at each of a series of doses (0.2, 0.3, 0.5, 0.75, 1.0, and 2.0 J/cm²). Six specimens were cut from the center portion of each plate of the samples prepared. A Universal Testing Instrument, INSTRON Model 4201 equipped with a suitable personal computer and software "Series IX Materials Testing System" was used to measure the modulus of each specimen. The modulus measurements were then entered into the software package and the calculations were automatically performed with a determination of the average modulus for each film sample. The dose-modulus curve was then created by plotting the modulus values as a scatter plot and the above equation as a line. The cure speed of the coating composition was determined to be the dose at which 95% of the ultimate secant modulus is attained.

Tensile Strength, Elongation and Modulus Test Method

The tensile strength, elongation and secant modulus of cured samples were tested using a universal testing instrument, Instron Model 4201 equipped with a personal computer and software "Series IX Materials Testing System." The load cells used were 4.4 Kg capacity. The ASTM D638M was followed, with the following modifications.

A drawdown of each material to be tested was made on glass plate and cured using a UV processor. A minimum of eight test specimens, having a width of 12.7±0.005 mm and a length of 12.7 cm, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The crosshead speed was set to 25.4 mm/min, and the crosshead action was set to "return at break". The crosshead was adjusted to 50.8 mm jaw separation. The air pressure for the pneumatic grips was turned on and set to approximately 1.5 Kg/cm².

After the Instron test instrument had been allowed to warm-up for fifteen minutes, it was calibrated and balanced following the manufacturer's operating procedures.

The temperature near the Instron instrument was measured and the humidity was measured at the location of the humidity gauge. This was done just before beginning measurement of the first test specimen.

Specimens were only analyzed if the temperature was within the range 23±1.0° C. and the relative humidity was within 50±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and secant, or segment, modulus were checked to determine whether any one of them deviated from the average enough to be an "outlier." If the modulus value was an outlier, it was discarded. If there were less than six data values for the tensile strength, then the entire data set was discarded and repeated using a new plate.

What is claimed is:

1. A method for preparing a series of radiation-curable compositions having at least one uniformly consistent property comprising:
   a) forming a pre-composition comprising a radiation-curable oligomer;
   b) measuring an in-situ sample of said pre-composition to determine a property value of said at least one property of the cured pre-composition;
   c) adding a pre-determined amount of at least one adjusting agent to said pre-composition to form a radiation-curable composition (R1); and
   d) preparing at least one further radiation-curable composition (R2) by
      i) forming a further pre-composition comprising a radiation-curable oligomer, and
      ii) repeating b) through c) to form at least one further radiation-curable composition;
wherein said property values for each of said composition (R1) and said at least one further composition (R2) are each within a target value range of ±15% of a target value for said property.

2. The method according to claim 1, wherein said target value range is within ±10% of the target property value, when said target property value has an absolute value greater than 20, and wherein said target value range is within ±2 units of the target property value, when said target property value is less than 20.

3. The method of claim 1, wherein said property is modulus.

4. The method of claim 3, wherein said property value is within ±0.4 MPa of a target modulus value.

5. The method of claim 4, wherein said target modulus value is between 0.9 and 1.3 MPa.

6. The method of claim 4, wherein the target value of said modulus is between about 50 MPa and about 200 MPa.

7. The method of claim 4, wherein the target value of said modulus is between 100 and 1000 MPa.

8. The method of claim 1, wherein said property is cure speed.

9. The method of claim 8, wherein said property value is within ±0.2 J/cm$^2$ of a target cure speed value.

10. The method of claim 9, wherein said target cure speed value is 0.5 J/cm$^2$ or less.

11. The method of claim 1, wherein said property is Tg.

12. The method of claim 11, wherein said property value is within ±5° C. of a target Tg value.

13. The method of claim 12, wherein said target Tg value is between −30 and 70° C.

14. The method of claim 1, further comprising:
   adjusting said pre-composition to control a second property value within a target value range for said second property value.

15. The method of claim 14, wherein said second property value is determined by an in-situ measurement.

16. The method of claim 14, wherein said second property value is a characteristic of a cured composition.

17. The method of claim 14, wherein said second property value is determined by measuring a cured in-situ sample of said pre-composition.

18. The method of claim 14, wherein said property is modulus and said second property is viscosity.

19. The method of claim 18, wherein said second property is viscosity, measured in mPa-s, and is within ±1,000 mPa-s of a target viscosity value.

20. The method of claim 19, wherein said target viscosity value is between 5,000 and 10,000 mPa-s.

21. The method claim 1, wherein said pre-composition comprises at least one oligomer or monomer having a viscosity lower than said radiation-curable oligomer.

22. The method of claim 21, wherein said at least one adjusting agent is different than said at least one oligomer or monomer having a viscosity lower than said radiation-curable oligomer.

23. The method according to claim 1, wherein said radiation-curable composition comprises, relative to the total weight of said radiation-curable composition, 0.1–10 wt. % of said at least one adjusting agent.

24. The method of claim 23, wherein said at least one adjusting agent comprises, relative to the total weight of said composition,
   0–10 wt. % of at least one property value increasing agent; and
   0–10 wt. % of at least one property value reducing agent.

25. The method according to claim 1, wherein the cure speed of said radiation-curable composition (R1) and said at least one further radiation-curable composition (R2) is less than 0.6 J/cm$^2$.

26. The method according to claim 1, wherein said at least one adjusting agent includes a difunctional monomer.

27. The method according to claim 1, wherein said at least one adjusting agent modifies the modulus of said pre-composition.

28. The method according to claim 1, wherein said at least one adjusting agent includes at least one modulus increasing agent and/or at least one modulus reducing agent.

29. The method of claim 1, wherein said adjusting agent is an oligomer, a monomer or a mix of oligomer and monomer.

30. The method of claim 1, wherein said property is elongation.

31. The method of claim 30, wherein the target value of said elongation is greater than 100%.

* * * * *